United States Patent
Kanaoka et al.

(10) Patent No.: US 6,548,583 B2
(45) Date of Patent: Apr. 15, 2003

(54) THERMOPLASTIC RESIN COMPOSITION AND SHAPED BODY THEREOF

(75) Inventors: Kunio Kanaoka, Sakaide (JP); Hitoshi Taniguchi, Marugame (JP); Suminori Tanaka, Kagawa-ken (JP); Masanao Orihara, Marugame (JP); Yoshiro Tange, Marugame (JP)

(73) Assignee: Okura Industrial Co., Ltd., Marugame (JP)

( * ) Notice: Subject to any disclaimer, the term of this patent is extended or adjusted under 35 U.S.C. 154(b) by 0 days.

(21) Appl. No.: 09/953,177

(22) Filed: Sep. 17, 2001

(65) Prior Publication Data
US 2002/0055577 A1 May 9, 2002

(30) Foreign Application Priority Data
Sep. 20, 2000 (JP) ........................................ 2000-284569

(51) Int. Cl.$^7$ ................................................. C08K 3/10
(52) U.S. Cl. ........................................................ 524/403
(58) Field of Search ........................................... 524/403

(56) References Cited

U.S. PATENT DOCUMENTS 5,786,785 A 7/1998 Gindrup et al. ................. 342/1

FOREIGN PATENT DOCUMENTS

JP 9-215954 8/1997

*Primary Examiner*—Edward J. Cain

(57) ABSTRACT

A composition including a thermoplastic resin, and a combustion accelerator composed of an inorganic carrier and a platinum group element supported on the inorganic carrier in an amount of 0.001–0.2% by weight based on a total weight of the inorganic carrier and the platinum group element. The combustion accelerator is in the form of particles and present in such an amount that the concentration of the platinum group element is 0.5–100 ppm by weight based on a total weight of the combustion accelerator and the thermoplastic resin.

6 Claims, No Drawings

THERMOPLASTIC RESIN COMPOSITION AND SHAPED BODY THEREOF

BACKGROUND OF THE INVENTION

This invention relates to a thermoplastic resin composition capable of being combusted in a high efficiency. The present invention is also directed to a shaped body, such as films, plates, columns, cylinders, blocks, spheres, etc. formed of the thermoplastic resin composition.

Thermoplastic resins are now used for various applications such as electric, mechanical and automobile parts, construction materials, receptacles and packaging materials because of excellent moldability, and mechanical and physical properties thereof. As the thermoplastic resins are used in a large amount in a wide variety of fields, disposal thereof is now one of the important social problems.

One customarily employed method for the disposal of thermoplastic resins is a combustion treatment. The combustion treatment, however, poses problems of generation of combustion waste gas containing carbon monoxide, nitrogen oxides and sulfur oxides. Depending upon kinds of thermoplastic resin, the combustion gas may contain dioxins. The conventional combustion treatment of thermoplastic resins also has a difficulty, since a treatment at a high temperature under a high oxygen concentration is effective for the reduction of carbon monoxide in the combustion gas but is disadvantageous for the reduction of nitrogen oxides.

JP-A-H07-257594 and JP-A-H07-322910 propose a thermoplastic resin film containing specific iron oxide powder such as geothite. While such a film can be efficiently combusted even at a low temperature and in a low oxygen concentration condition, the use of iron oxide has a problem because the film has a color inherent to the iron oxide. Thus, the iron oxide-containing film is used only in a field, such as bags for garbage, in which good appearance is not of importance.

SUMMARY OF THE INVENTION

It is, therefore, an object of the present invention to provide a thermoplastic resin composition which can be efficiently combusted while effectively reducing the amount of harmful substances generated by the combustion.

Another object of the present invention is to provide a thermoplastic resin composition of the above-mentioned-type capable of providing shaped bodies which have high lightness and a good color tone.

It is a further object of the present invention to provide a shaped article of a thermoplastic resin composition of the above-mentioned-type.

In accomplishing the above objects, there is provided in accordance with the present invention a composition comprising a thermoplastic resin, and a combustion accelerator including an inorganic carrier and a platinum group element supported on said inorganic carrier in an amount of 0.001–0.2% by weight based on a total weight of said inorganic carrier and said platinum group element, said combustion accelerator being in the form of particles and present in such an amount that the concentration of said platinum group element is 0.5–100 ppm by weight based on a total weight of said combustion accelerator and said thermoplastic resin.

The thermoplastic resin composition in the form of a molding such as a film, plate or block may be transparent, transluecent or opaque and is colorless or monochromatic (e.g. white, milky white or light gray) in the absence of a coloring agent. When a coloring agent is contained, a good color tone is obtainable without adversely affected by the combustion accelerating agent. The molding is also characterized by its high lightness.

Other objects, features and advantages of the present invention will become apparent from the detailed description of the preferred embodiments to follow.

DETAILED DESCRIPTION OF THE PREFERRED EMBODIMENTS OF THE INVENTION

A thermoplastic resin composition according to the present invention comprises a thermoplastic resin, and a combustion accelerator which includes an inorganic carrier and a platinum group element supported thereon.

The platinum group element may be palladium, platinum, ruthenium, rhodium, osmium or iridium. Above all, the use of palladium or platinum which is easily feasible is preferred.

Any inorganic carrier may be used to support the platinum group element. Examples of the inorganic carriers include metal oxides and metal carbonates. Illustrative of suitable inorganic carriers are alumina (such as $\alpha$-alumina and activated alumina), silica, titania, zeolite, calcium carbonate, magnesia, zirconia, thoria, boria, silica-alumina, silica-zirconia, alumina-zirconia. For reasons of costs and colorlessness of the composition, the use of alumina, silica, titania, zeolite, calcium carbonate or magnesia is particularly preferred. The above inorganic materials may be used alone or in combination of two or more.

The inorganic carrier is in the form of particles having an average particle diameter of 50 $\mu$m or less, preferably 0.1–20 $\mu$m, more preferably 0.2–10 $\mu$m.

The platinum group element may be supported on the inorganic carrier using any of the procedures known to the man skilled in the art of supported catalysts, such as by impregnation, ion-exchange, concentration or precipitation. In accordance with a preferred mode of operation, the inorganic carrier is impregnated with a solution containing compounds containing a precursor of a platinum group element. The precursor may be a compound conventionally used for the preparation of catalysts, in particular chlorides, chloro complexes, nitrates and acetylacetonates. By way of example mention may be made of chloroplatinic acid, palladium chloride, platinum tetrammine chloride, dinitrodiaminoplatinum and palladium nitrate. The impregnation is followed by drying at 50–200° C. and calcinations at 400–800° C., generally in air, to fix the platinum group element on the inorganic carrier as an active metal or an oxide. When alumina is used as a carrier, a platinum group element-loaded alumina may be suitably produced by impregnating aluminum hydroxide with a solution of a platinum group element compound, the impregnated material being subsequently calcined. During the calcination, the aluminum hydroxide undergoes dehydration to form pores in the resulting alumina, on the wall of which the platinum group element deposits.

It is important that the amount of the platinum group element supported on the inorganic carrier should be in the range of 0.001–0.2% by weight based on a total weight of the inorganic carrier and the platinum group element. An amount of the platinum group element below 0.001% by weight is insufficient to obtain desired combustion accelerating effect. Too large an amount of the platinum group element in excess of 0.2% by weight causes undesirable increase of costs as well as coloring of the combustion accelerator. The amount of the platinum group element is preferably 0.005–0.15% by weight, more preferably 0.01–0.08% by weight.

The particle size of the combustion accelerator is generally the same as that of the inorganic carrier used and has an average particle diameter of 50 μm or less, preferably 0.1–20 μm, more preferably 0.2–10 μm. The combustion accelerator may contain an additional catalytic metal element or a dopant, if desired.

The above combustion accelerator is dispersed, preferably uniformly, into a thermoplastic resin to obtain a resin composition according to the present invention. Any thermoplastic resin may be employed for the purpose of the present invention. Examples of the thermoplastic resins include polyolefin resins such as polyethylene, ethylene-α-olefin copolymers, ethylene-vinyl acetate copolymers and polypropylene; polyamide resins such as nylon 6 and nylon 66; polystyrene resins; polyester resins such as polyethylene terephthalate and polybutylene terephthalate; polyvinyl chloride resins; and mixtures thereof. For reasons of freedom of chlorine, the use of a polyolefin resin is preferred.

Any suitable known method, such as kneading with rollers, a kneader or an extruder, may be adopted to disperse the combustion accelerator into the thermoplastic resin. In one preferred method, a master batch is previously prepared from the desired combustion accelerator and thermoplastic resin. In use, the master batch is blended with an additional amount of the thermoplastic resin and the blend is molded by any suitably method, such as extrusion molding, injection molding or compression molding, into any desired shape.

It is important that the combustion accelerator should be used in such an amount that the concentration of the platinum group element is 0.5–100 ppm by weight based on a total weight of the combustion accelerator and the thermoplastic resin. An amount of the platinum group element in the resin composition less than 0.5 ppm is insufficient to obtain the desired combustion accelerating effect. On the other hand, no additional merits are obtainable and, rather, costs are increased when the amount of the platinum group element is over 100 ppm. The concentration of the platinum group element is preferably 1–50 ppm by weight, more preferably 2–20 ppm by weight, based on a total weight of the combustion accelerator and the thermoplastic resin.

The thermoplastic resin composition may contain one or more additives which are customarily employed for forming shaped bodies of thermoplastic resins. Examples of such additives include a colorant, a UV-absorber, an antistatic agent and a filler.

Since the combustion accelerator in the form of fine particles is dispersed in the thermoplastic resin, the combustion of the thermoplastic resin can proceed in the conditions where the thermoplastic resin and decomposition gases or solids thereof are effectively contacted with the combustion accelerator.

The following examples will further illustrate the present invention. Parts are by weight.

PREPARATION EXAMPLE 1

Alumina powder having an average particle diameter of 1.0 μm was impregnated with an aqueous solution of palladium nitrate. The impregnated alumina was then dried and calcined at 500° C. to obtain a white combustion accelerator (hereinafter referred to as "Accelerator I") having a palladium content of 0.05% by weight. The combustion accelerator exhibited methane oxidation activity of 95.2%. The methane oxidation activity was measured as follows:

Sample combustion accelerator (50 mg) is packed in a pulse-type fixed bed reactor. While continuously passing helium gas through the reactor at a flow rate of 40 ml/min, 1 ml of a gas containing 1.0% methane, 2.4% oxygen and the balance helium is passed through the reactor at 500° C. as a pulsed flow. The gas discharged from the reactor is measured by gas chromatography for methane oxidation activity in terms of conversion of methane.

PREPARATION EXAMPLE 2

Alumina powder having an average particle diameter of 3.0 μm was impregnated with an aqueous solution of palladium nitrate. The impregnated alumina was then dried and calcined at 500° C. to obtain a dark brown combustion accelerator (hereinafter referred to as "Accelerator II") having a palladium content of 2.0% by weight. The combustion accelerator exhibited methane oxidation activity of 100%.

EXAMPLE 1

98 Parts of a low density polyethylene and 2 parts of Accelerator I were mixed and kneaded to obtain a resin composition having a palladium concentration of 10 ppm by weight. The resin composition was subjected to a combustion test. The $CO_2$ and CO concentration in the combustion waste gas were 2.50% and 0.23%, respectively. No smog was observed, indicating that perfect combustion occurred. The resin composition was extruded to obtain a colorless film having a thickness of 100 μm. The lightness (L*) of the film measured with a colorimeter was 96.82.

The combustion test and lightness were measured as follows.

Combustion test:

Sample composition (10 mg) is charged in a quartz glass tube and combusted at 500° C. for 3 minute while feeding oxygen to the tube at a flow rate of 200 ml/min. The combustion waste gas is measured for concentrations of $CO_2$ and CO by gas chromatography. The greater the $CO_2$ concentration (the lower the CO concentration), the better is the combustion efficiency.

Lightness:

Sample film is placed on a white plate and is measured for lightness (L*) using a colorimeter (manufactured by Minolta Corporation). The greater the whiteness, the greater is lightness (L*). Lightness of a film (thickness: 100 μm) of at least 90, especially at least 95, is preferred.

EXAMPLE 2

90 Parts of a low density polyethylene (same resin as that used in Example 1) and 10 parts of Accelerator I were mixed and kneaded to obtain a resin composition having a palladium concentration of 50 ppm by weight. The resin composition was subjected to a combustion test. The $CO_2$ and CO concentration in the combustion waste gas were 2.52% and 0.22%, respectively. No smog was observed, indicating that perfect combustion occurred. The resin composition was extruded to obtain a milky white film having a thickness of 100 μm. The lightness (L*) of the film measured with a colorimeter was 95.96.

COMPARATIVE EXAMPLE 1

Low density polyethylene (same resin as that used in Example 1) was subjected to a combustion test. The $CO_2$ and CO concentration in the combustion waste gas were 2.20% and 0.30%, respectively. Black smog was observed, indicating that combustion was not perfect. The resin composition was extruded to obtain a colorless film having a thickness of 100 μm. The lightness (L*) of the film measured with a colorimeter was 97.11.

COMPARATIVE EXAMPLE 2

90 Parts of a low density polyethylene (same resin as that used in Example 1) and 10 parts of alumina (same as that used in Example 1) were mixed and kneaded to obtain a resin composition containing no palladium. The resin composition was subjected to a combustion test. The $CO_2$ and CO concentration in the combustion waste gas were 2.19% and 0.30%, respectively and almost the same as those in Comparative Example 1.

COMPARATIVE EXAMPLE 3

99 Parts of a low density polyethylene (same resin as that used in Example 1) and 1 part of geothite (average particle diameter: 0.25 μm, specific surface area: 84 m²/g, methane oxidation activity: 96.9%) were mixed and kneaded to obtain a resin composition having a geothite concentration of 10,000 ppm by weight. The resin composition was subjected to a combustion test. The $CO_2$ and CO concentration, in the combustion waste gas were 2.46% and 0.25%, respectively. No smog was observed, indicating that perfect combustion occurred. The resin composition was extruded to obtain a yellow film having a thickness of 100 μm. The lightness (L*) of the film measured with a colorimeter was 86.70.

COMPARATIVE EXAMPLE 4

90 Parts of a low density polyethylene (same resin as that used in Example 1) and 10 parts of Accelerator II were mixed and kneaded to obtain a resin composition having a palladium concentration of 2000 ppm by weight. The resin composition was subjected to a combustion test. The $CO_2$ and CO concentration in the combustion waste gas were 2.51% and 0.22%, respectively. No smog was observed, indicating that perfect combustion occurred. The resin composition was extruded to obtain a light brown film having a thickness of 100 μm. The lightness (L*) of the film measured with a colorimeter was 66.92.

EXAMPLE 3

90 Parts of a low density polyethylene (same resin as that used in Example 1), 10 parts of polyvinyl chloride and 4 parts of Accelerator I were mixed and kneaded to obtain a resin composition having a palladium concentration of 19.2 ppm by weight. The resin composition (3 g) was combusted in a quartz glass tube at 700° C. under a synthetic air stream at a flow rate of 2 L/min. The combustion waste gas discharged from the quartz glass tube was introduced into a sampling device and was analyzed for dioxins and PCBs in accordance with Japanese Industrial Standard JIS K 0311. The results (per 1 g sample) are shown in Table 1. The resin composition was extruded to obtain a film having a thickness of 100 μm and lightness (L*) of 95.03.

COMPARATIVE EXAMPLE 5

Example 3 was repeated in the same manner as described except that Accelerator I was not used at all. The results of the combustion test are shown in Table 1. The lightness of a film obtained from the accelerator-free resin composition was 96.23.

TABLE 1

|  | Example 3 | Comparative Example 5 |
|---|---|---|
| PCDDs (ng/g) | 1.9 | 13 |
| PCDFs (ng/g) | 10 | 82 |
| PCDDs + PCDFs (ng/g) | 12 | 95 |
| PDCCs/DFs Toxicity Equivalent (ng-TEQ/g) | 0.26 | 1.6 |
| Coplanar PCB Toxicity Equivalent (ng-TEQ/g) | 0.0037 | 0.042 |
| Dioxins Toxicity Equivalent (ng-TEQ/g) | 0.27 | 1.7 |

As will be appreciated from the results shown in Examples 1–3 and Comparative Examples 1–5, the combustion accelerator-containing resin compositions of the present invention have high lightness and can be efficiently combusted while significantly reducing generation of harmful substances. Whilst the elements of platinum group are expensive, the content thereof in the composition is very small.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A composition comprising a thermoplastic resin, and a combustion accelerator including an inorganic carrier and a platinum group element supported on said inorganic carrier in an amount of 0.001–0.2 by weight based on a total weight of said inorganic carrier and said platinum group element, said combustion accelerator being in the form of particles and present in such an amount that the concentration of said platinum group element is 0.5–100 ppm by weight based on a total weight of said combustion accelerator and said thermoplastic resin, wherein said inorganic carrier is in the form of particles having an average particle diameter of 50 μm or less.

2. A composition as claimed in claim 1, wherein said platinum group element is platinum or palladium.

3. A composition as claimed in claim 1, wherein said inorganic carrier is at least one substance selected from the group consisting of metal oxides and metal carbonates.

4. A composition as claimed in claim 1, wherein said inorganic material is at least one substance selected from the group consisting of alumina, silica, titania, zeolite, calcium carbonate and magnesia.

5. A shaped body of a composition according to claim 1.

6. A composition as claimed in claim 1 wherein the concentration of said platinum group element is 0.5–20 ppm by weight based on a total weight of said combustion acceleration and said thermoplastic resin.

* * * * *